(12) United States Patent
Paetzold et al.

(10) Patent No.: US 9,089,788 B2
(45) Date of Patent: Jul. 28, 2015

(54) PROCESS FOR PURIFYING CHLOROSILANES BY DISTILLATION

(75) Inventors: Uwe Paetzold, Burghausen (DE); Walter Haeckl, Zeilarn (DE); Jan Prochaska, Burghausen (DE)

(73) Assignee: Wacker Chemie AG, Munich (DE)

( * ) Notice: Subject to any disclaimer, the term of this patent is extended or adjusted under 35 U.S.C. 154(b) by 694 days.

(21) Appl. No.: 13/358,919

(22) Filed: Jan. 26, 2012

(65) Prior Publication Data
US 2012/0193214 A1 Aug. 2, 2012

(30) Foreign Application Priority Data
Feb. 1, 2011 (DE) .......................... 10 2011 003 453

(51) Int. Cl.
| B01D 3/14 | (2006.01) |
| C01B 33/107 | (2006.01) |
| C01B 33/037 | (2006.01) |
| C01B 33/04 | (2006.01) |

(52) U.S. Cl.
CPC .......... B01D 3/143 (2013.01); C01B 33/10778 (2013.01); C01B 33/037 (2013.01); C01B 33/046 (2013.01)

(58) Field of Classification Search
CPC C01B 33/037; C01B 33/046; C01B 33/1071; C01B 33/10778; B01D 3/143; B01D 5/006
USPC .................. 202/154, 155; 203/71, 74, 75, 78; 423/341, 342, 347
See application file for complete search history.

(56) References Cited

U.S. PATENT DOCUMENTS

| 3,919,399 | A | * | 11/1975 | Schabacher et al. | .......... | 423/488 |
| 4,092,446 | A | * | 5/1978 | Padovani et al. | .............. | 427/213 |
| 4,454,104 | A | * | 6/1984 | Griesshammer et al. | ...... | 423/349 |
| 4,980,143 | A |  | 12/1990 | Ruff |  |  |
| 5,118,485 | A | * | 6/1992 | Arvidson et al. | ............. | 423/342 |
| 6,060,021 | A | * | 5/2000 | Oda | ................................ | 422/40 |
| 8,524,048 | B2 | * | 9/2013 | Gu et al. | ......................... | 203/81 |
| 8,535,488 | B2 | * | 9/2013 | Choi et al. | ..................... | 203/74 |
| 8,691,055 | B2 | * | 4/2014 | Ghetti | ............................. | 203/29 |
| 2009/0020413 | A1 | * | 1/2009 | Popp et al. | .................... | 204/164 |

(Continued)

FOREIGN PATENT DOCUMENTS

| DE | 158322 A3 | 1/1983 |
| DE | 102007014107 A1 | 9/2008 |

(Continued)

OTHER PUBLICATIONS

O'Mara et al., "Handbook of Semiconductor Silicon Technology", p. 4, Fig. 2 (Noyes Publ. USA, 1990).
English-language Abstract of DD 158322 A3, Date: 1983.
Abstract in English for JP 59-035017, Date: 1984.

Primary Examiner — In Suk Bullock
Assistant Examiner — Elizabeth Cardin
(74) Attorney, Agent, or Firm — Caesar Rivise, PC

(57) ABSTRACT

The invention relates to a process for purifying chlorosilanes by distillation, which includes providing a boron-containing mixture of chlorosilanes containing TCS, DCS and STC and purifying the mixture of chlorosilanes by distillation in a plurality of distillation columns, wherein low-boiling boron compounds are branched off from the distillation columns by overhead streams containing boron-enriched DCS and high-boiling boron compounds are branched off by a boron-enriched bottom stream containing high boilers.

14 Claims, 2 Drawing Sheets

(56) References Cited

U.S. PATENT DOCUMENTS

2009/0068081 A1   3/2009  Uehara et al.
2010/0061911 A1*  3/2010  Hariharan et al. ............ 423/341
2010/0320072 A1  12/2010  Schwarz et al.
2011/0150739 A1   6/2011  Seliger et al.
2011/0184205 A1   7/2011  Rauleder et al.

FOREIGN PATENT DOCUMENTS

| | | |
|---|---|---|
| DE | 102008002537 A1 | 12/2009 |
| DE | 102008054537 A1 | 6/2010 |
| EP | 2036858 A2 | 3/2009 |
| JP | 59-035017 A | 2/1984 |
| JP | 02-097415 A | 4/1990 |

* cited by examiner

PROCESS FOR PURIFYING CHLOROSILANES BY DISTILLATION

BACKGROUND OF THE INVENTION

The present invention relates to a process for purifying chlorosilanes by distillation.

The production of polycrystalline silicon, which is used, for example, in photovoltaics or in the semiconductor industry, starts out from the raw material trichlorosilane (TCS).

This TCS is produced mainly by three different processes.
A) $Si+3\ HCl \rightarrow SiHCl_3+H_2+$by-products
B) $Si+3\ SiCl_4+2\ H_2 \rightarrow 4\ SiHCl_3+$by-products
C) $SiCl_4+H_2 \rightarrow SiHCl_3+HCl+$by-products In these processes, relatively large amounts of dichlorosilane (DCS) are formed in addition to other by-products or impurities.

Thus, it is known that about 0.1-1.0% of DCS is present in the reaction product of the hydrochlorination of metallurgical silicon as per (A).

The reaction of metallurgical silicon with silicon tetrachloride (STC) and hydrogen (B) generally gives even higher DCS contents in the reaction product, in particular when copper is used as catalyst for this process.

In the hydrogenation of STC as per (C), too, 0.05-1.0% of DCS is found in the reaction product.

DCS is itself a useful product which could be used in the semiconductor industry for the deposition of silicon but also for preparing organofunctional silanes.

However, a very high purity is a prerequisite here. For example, the concentration of boron should be <10 ppta for semiconductor applications.

A further example which may be mentioned is hydrosilylation. In hydrosilylation, derivatives of hydrosilanes are reacted by a catalytic addition reaction onto vinyl groups or other multiple bonds. Typical catalysts are complexes of the noble metal platinum. Here, the concentration of boron should be <1 ppbw since boron acts as a catalyst poison.

DCS from the abovementioned processes A-C is unsuitable for these applications since, in particular, the boron contents are too high.

Since boron is mainly present as $BCl_3$ having a boiling point of 8.3° C. and has a boiling point similar to that of DCS (boiling point 12.5° C.), boron is concentrated virtually completely in the DCS product stream in the subsequent distillation.

Despite a difference in boiling point of just about 30 K, separation of $BCl_3$ from TCS by distillation is incomplete, particularly when boron contents of <0.1 ppm in the TCS are to be achieved.

In the prior art, the $BCl_3$ produced in the hydrochlorination of metallurgical silicon is discharged together with an amount of trichlorosilane from the system. This is described, for example, in "Handbook of Semiconductor Silicon Technology", William C. O'Mara, Robert B. Herring and Lee P. Hunt, Noyes Publications, USA 1990, see page 4, fig. 2.

Because of the very similar boiling point, DCS is also discharged together with $BCl_3$ from the system, which leads to poorer economics of the overall plant.

Essentially four different approaches are known for separating boron impurities from TCS.

Thus, purely distillative processes and also processes having a hydrolysis, complexation or adsorption step have been described.

DE 10 2007 014 107 A1 describes a process for obtaining boron-depleted chlorosilanes from a boron-containing chlorosilane mixture by removal of a boron-enriched distillation stream by distillation, with a boron-enriched side stream being branched off from at least one distillation column of an arrangement of one or more distillation columns and disposed of or passed to another use. Various column arrangements and taking off of products from overhead and side offtakes on the respective columns enables the boron content in the pure DCS in substreams to be reduced to about 50 ppm. However, the boron concentration is increased even more greatly in another substream containing DCS and TCS. A further disadvantage is that a not inconsiderable amount of TCS is lost as waste.

DE 10 2008 002 537 A1 discloses a process for reducing the boron content in composition I comprising at least one silicon halide, in which process the composition I is, in a first step, brought into contact with up to 600 mg of moisture per kilogram of the composition I, the composition I which has been brought into contact with moisture from the first step is optionally entirely or partly passed at least once to a substep for separating off hydrolyzed boron- and/or silicon-containing compounds to give a prepurified composition II which is entirely or partly returned to the first step or fed to a second step of the process, where hydrolyzed boron- and/or silicon-containing compounds are separated off by distillation in the second step to give a prepurified composition II having a reduced content of boron as distillate.

The boron content in chlorosilanes can thus be reduced by, for example, adding water in a suitable form. Reaction of boron halide with water forms higher-boiling hydrolysates which can be separated more easily from chlorosilane by distillation. However, these processes require an additional purge stream in order to separate off the boron and chlorosilane hydrolysates formed (e.g. >5% purge stream based on the starting material). Deposition of silica in plant components and corrosion due to HCl formed are also problematical. The corrosion subsequently leads to liberation of dopants such as P and As from the steel of the plants.

EP 2 036 858 A2 claims a process in which boron- and phosphorus-containing chlorosilanes are brought into contact with the complexing agent benzaldehyde and oxygen. As a result of oxidation and complex formation, the boron compounds present in the chlorosilane can be separated off easily. However, as described in example 6 of this patent application, about 10% of residues with which the boron complex has to be discharged are obtained. Owing to the relatively slow reaction (30 min), this process is not suitable for continuous operation. In addition, the outlay in terms of apparatus is increased by a stirred vessel and the introduction of organic contamination into the target product is probable.

DE 10 2008 054 537 describes a process for treating a composition containing at least one silicon compound and at least one foreign metal and/or a compound containing a foreign metal, in which the composition is, in a first step, brought into contact with at least one adsorbent and/or at least one first filter and is optionally, in a further step, brought into contact with at least one filter to give a composition in which the content of the foreign metal and/or the compound containing a foreign metal is reduced.

Here, the boron content in chlorosilanes is reduced by contacting with water-free adsorbents. However, very large amounts of adsorbent (120 g/250 ml of TCS) are required in order to achieve the desired purification effect. This makes the process uneconomical, especially since a continuous process is not really feasible, which is an economic disadvantage in the production of chlorosilanes in semiconductor quality. The use of adsorbents also requires further apparatus (e.g. filtration) and incurs the risk of introducing other impurities into the semiconductor-pure product.

In the light of the problems described, it was an object of the invention to purify contaminated chlorosilanes with a reduced outlay and accumulate and discharge the impurities in ideally small purge streams. On the present-day economical scale, the yield of TCS has to be significantly above 95%.

It has been found that purely distillative processes are advantageous since no additional apparatus is required and these processes can be operated continuously in a simple way. The losses of chlorosilanes can be best minimized in these.

An advantage of distillation processes is the fact that the risk of introduction of further impurities is very low.

SUMMARY OF THE INVENTION

The object of the invention is achieved by a process for purifying chlorosilanes by distillation, which comprises providing a boron-containing mixture of chlorosilanes containing TCS, DCS and STC and purifying the mixture of chlorosilanes by distillation in a plurality of distillation columns, wherein low-boiling boron compounds are branched off from the distillation columns by means of overhead streams containing boron-enriched DCS and high-boiling boron compounds are branched off by means of a boron-enriched bottom stream containing high boilers.

The mixture of chlorosilanes which is provided is preferably produced by reaction of metallurgical silicon with HCl in a fluidized-bed reactor at 350-400° C.

The mixture of chlorosilanes which is provided is preferably fed to a separation column in which the column parameters are selected so that less than 10 ppm of STC are present in a first fraction from this separation column and less than 10 ppm of TCS are present in a second fraction from this separation column.

Relevant column parameters are, inter alia, pressure, temperature at the bottom and number of theoretical plates.

The second fraction from the separation column is preferably fed to a second column and separated by distillation into an overhead stream containing STC and a boron-enriched bottom stream containing high boilers.

The first fraction from the separation column is preferably fed to a third column and separated by distillation into a bottom stream containing TCS and a boron-enriched overhead stream containing TCS together with low boilers such as DCS.

The overhead stream containing TCS and low boilers such as DCS from the third column is preferably fed into a fourth column into which inert gas is fed, with an overhead stream containing boron-enriched DCS from the fourth column being discharged, a bottom stream from the fourth column being recirculated to the separation column and a secondary stream containing offgas from the fourth column being disposed of.

The fourth column is preferably operated under superatmospheric pressure.

The overhead stream containing TCS and low boilers such as DCS from the third column is preferably liquefied before being fed into the fourth column.

BRIEF DESCRIPTION OF THE DRAWINGS

The invention is illustrated below with the aid of FIGS. 1 and 2.

DETAILED DESCRIPTION OF THE INVENTION

Figure 1:
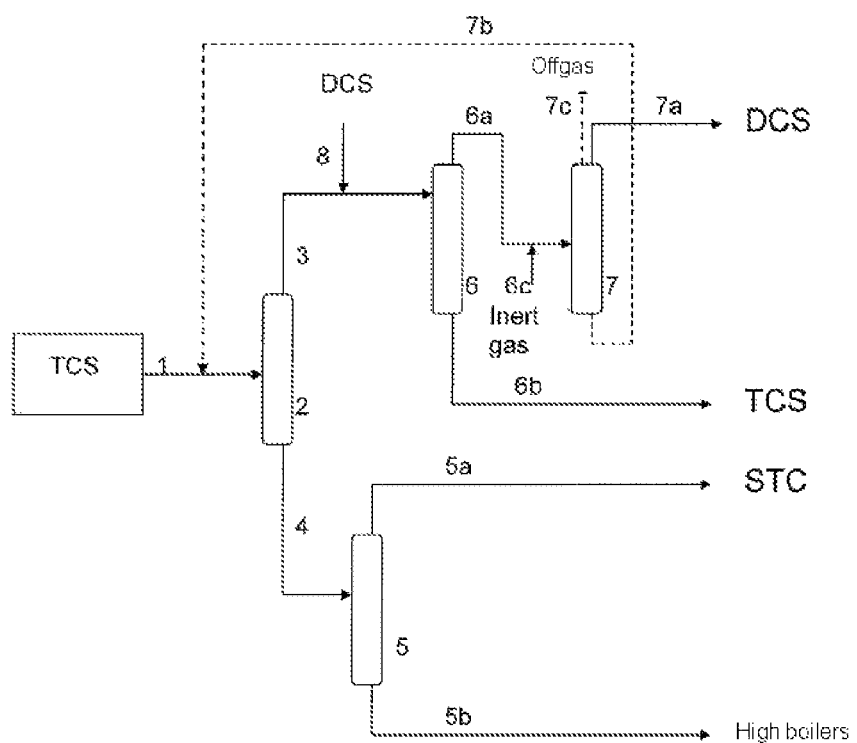
FIG. 1 shows a flow diagram of a process for working up a chlorosilane mixture by distillation.

FIG. 1 shows the principle of the work-up by distillation of a chlorosilane mixture obtained as reaction product of the hydrochlorination of metallurgical silicon. The essential objective is the separation of boron and phosphorus impurities from the target product TCS.

Figure 2:
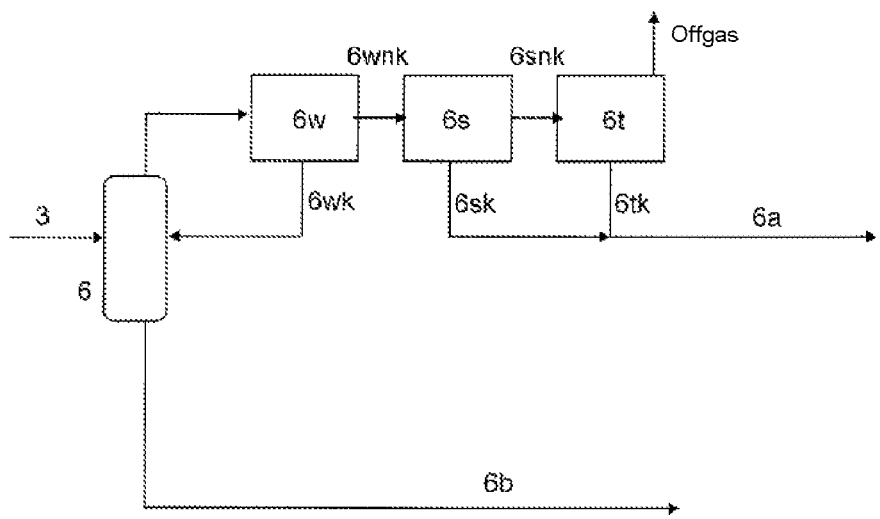
FIG. 2 schematically shows the condensation of the overhead product from a distillation column.

FIG. 2 shows the condensation of the overhead product from the distillation column 6, cf. FIG. 1.

The overhead product is cooled in succession by means of a water cooler 6w, a brine cooler 6s and a low-temperature cooler (Frigen) 6t. The condensate formed in each case is reused. The condensate from the water cooler is recirculated to the column. The condensates from the brine and low-temperature coolers are fed as product stream 6a to the column 7. The offgas is disposed of.

The invention is based on comprehensive analytical studies on the distribution of the boron impurities in the various chlorosilane fractions of an integrated plant for producing polycrystalline silicon.

The important steps of the present invention are the production of chlorosilanes, preferably TCS, by hydrochlorination of metallurgical silicon, purification of the chlorosilanes by distillation and the removal of DCS and STC fractions which are highly contaminated with boron from this mixture of chlorosilanes.

An effective removal of boron from TCS from the hydrochlorination of metallurgical silicon can, according to the invention, be achieved by distillation by using an arrangement of various columns as described below.

The objective is to concentrate the high-boiling boron compounds in an STC substream and low-boiling boron compounds in a DCS substream.

This makes it possible to produce TCS containing less than 20 ppb of boron while at the same time largely avoiding TCS in the waste.

The mixture of chlorosilanes 1 (FIG. 1) containing 86% of TCS, 13.5% of STC, 0.3% of DCS, 3.2 ppm of boron and traces of further impurities (methylchlorosilanes, hydrocarbons, high boilers such as siloxanes and disilanes) which is obtained by reaction of commercial metallurgical silicon with HCl in a fluidized-bed reactor at 350-400° C. is fed to a separation column 2.

Here, the column parameters are selected so that the overhead product 3 contains less than 10 ppm of STC and the bottom product 4 contains less than 10 ppm of TCS.

The bottom product 4 is fed to a further column 5 and separated there into an STC fraction 5a and a high boiler fraction 5b (e.g. siloxanes, disilanes, methyl-trichlorosilane and possibly metal chlorides).

The high-boiling compounds 5b can be separated off continuously or batchwise from the bottom of the column since they make up only about 1% of the total amount.

The overhead product 3 from the column 2 is separated in a next column 6 into a fraction 6b containing clean TCS and a fraction 6a containing TCS together with low boilers.

Additional streams of contaminated DCS containing TCS can be introduced into the overhead product 3 from column 2 before column 6 as long as they contain only negligibly small amounts of components having boiling points lower than that of TCS.

The fraction 6b is available for the further work-up.

The fraction 6a contains not only DCS but also not inconsiderable amounts of TCS and low-boiling impurities such as $BCl_3$.

This fraction is fed to an additional column 7, with, in a particularly preferred variant, inert gas being able to be additionally fed in. Column 7 is designed so that it can be operated at superatmospheric pressure.

The bottom product 7b from column 7 is recirculated for use in column 2.

The offgas 7c from column 7, which contains considerable amounts of boron, can be passed via a scrubber to further disposal.

The overhead product 7a from column 7 contains not only DCS but a large proportion of the boron contamination.

This stream therefore serves for the effective additional discharge of the boron contamination from the system.

As shown later in the examples, a drastic reduction in the boron content of the TCS stream is surprisingly obtained when the overhead product from column 6 is liquefied by means of multistage cooling and the condensate of the respective cooling steps is directed appropriately. (See FIG. 2).

It has been found to be particularly useful to cool the overhead product from the column 6 firstly by means of a water cooler 6w to a temperature of about 10-30° C., preferably 15-25° C.

The condensate 6wk from this cooler is recirculated to the column.

The uncondensed material 6wnk is fed to a brine cooler 6s which cools the product stream to about −7° C.

The condensate 6sk from this brine cooler forms the first component of the stream 6a.

The material 6snk which is not condensed in the brine cooler is fed to a low-temperature cooling stage 6t and condensed there to give 6tk.

This forms the second component for 6a. The low-temperature cooling stage cools the product stream to about −60° C. The material which is again not condensed there is disposed of as offgas. The total product stream 6a is fed to the column 7.

The substream 6b from the process described is the target product, viz. purified TCS, of an integrated chlorosilane plant for the production of polysilicon.

The TCS prepared in this way can be used directly or in admixture with other chlorosilane streams for the deposition of solar-quality polysilicon or be purified by means of further distillation steps to semiconductor quality.

EXAMPLES

The chlorosilane mixture 1 having the composition 86% of TCS, 13.5% of STC, 0.3% of DCS, 3.2 ppm of boron and traces of further impurities (methylchlorosilanes, hydrocarbons, high boilers such as siloxanes and disilanes) which had been obtained by reaction of commercial metallurgical silicon (boron content 32 ppm) with hydrogen chloride gas in a fluidized-bed reactor at 350-400° C. was worked up by distillation.

The overhead stream 3 from the column 2 contained 3.4 ppm of boron (mostly volatile $BCl_3$), and the bottom stream 4 contained 1.1 ppm of higher-boiling boron compounds.

The STC stream 4 was distilled in column 5, and the high boilers were separated off via the bottom stream; the removal of the boron compounds is incomplete since the overhead stream 5a still contained 1 ppm of boron.

Comparative Example 1

The chlorosilane stream 3 was distilled in a subsequent column 6. This was carried out in accordance with the prior art, i.e. simple discharge of boron impurities with an amount of chlorosilane.

Here, the column parameters were selected so that pure DCS distilled over at the top while the TCS was taken off from the bottom of the column.

The TCS which had been distilled in this way still contained 280 ppbw of boron compounds.

It was found that the boron compounds cannot be separated off completely together with DCS from the trichlorosilane.

Comparative Example 2

The chlorosilane stream 3 was distilled in a subsequent column 6. This was again carried out in accordance with the prior art, i.e. simple discharge of boron impurities with an amount of chlorosilane.

The column parameters were set so that a mixture of 10% of DCS and 90% of TCS was taken off at the top.

The TCS taken off at the bottom still contained 14 ppbw of boron.

However, 27 kg/h of TCS, based on 860 kg of TCS used, were lost.

Example 3

The low boiler-containing TCS fraction 3 was distilled in column 6, with the amount taken off at the top being selected so that a DCS concentration of 10% was established in the overhead product 6a.

A boron concentration of 88 ppm was found in 6a, and the bottom product from this column 6b contained 17 ppbw of boron.

The procedure described makes it possible to separate off more than 99% of the low-boiling boron compounds via the overhead product.

The DCS-containing fraction 6b was distilled in column 7 at a gauge pressure of from 0.1 to 2.5 bar.

Pure TCS containing <10 ppm of DCS and 2.6 ppm of boron was obtained in the bottom product 7b. This product was recirculated to the column 2.

99.4% of DCS, 0.6% of monochlorosilane and 770 ppm of boron were found in the overhead product 7a.

After all impurities had been separated off, about 83% of pure TCS containing less than 20 ppb of boron could be produced from the chlorosilane mixture 1.

The recirculation of the TCS fraction 7b increased the yield to 86%.

In addition, there are an STC fraction 5a which is obtained in an amount of about 13% based on the amount of the starting mixture and has a boron content of 1 ppm and a DCS fraction 7a which is obtained in an amount of 0.3% based on the amount of the starting mixture and contains about 770 ppm of boron.

Example 4

The low boiler-containing TCS fraction 3 was distilled as described in example 3.

However, 20 m³/h of nitrogen 6c having a residual moisture content of less than 1 ppmv of $H_2O$ was additionally introduced into the DCS-containing feedstream 6a to the column 7.

Ar or $H_2$ could also have been used as inert gases.

The position of the introduction of inert gas can be carried out either into the feed stream or at the column itself. For the purposes of the example, the inert gas was introduced into the feed stream.

In addition, a low-temperature condensation of the offgas was omitted.

As a result of the addition of inert gas, the amount of offgas from the column was increased.

Only 400 ppm of boron were found in the overhead product 7*a*.

Theoretically, more than twice the amount of boron would have been expected, i.e. more than 50% of the $BCl_3$ fed to the column accumulate in the offgas stream 7*c*.

This offgas stream, mainly nitrogen with traces of $BCl_3$, MCS and DCS, was passed to a scrubber and disposed of.

The TCS 6*b* produced in this example contained only 12 ppbw of boron.

The results are summarized in table 1.

TABLE 1

|  | TCS yield | B content of the TCS |
| --- | --- | --- |
| Comparative example 1 | 96.5% | 14 ppbw |
| Comparative example 2 | 100% | 280 ppbw |
| Example 3 | 100% | 17 ppbw |
| Example 4 | 100% | 12 ppbw |

Example 5

The low boiler-containing TCS fraction 3 was distilled as described in example 3.

Here, the brine condensate from column 6 was discharged to column 7 (cf. FIG. 2).

Surprisingly, this measure brings about a further drastic reduction in the concentration of impurities without reducing the TCS yield.

This measure obviously has a positive influence not only on the boron concentration but also on the phosphorus concentration.

The results are summarized in table 2.

In example 5, there are considerable improvements over example 3, both in respect of the boron contamination and also the phosphorus contamination at a constant TCS yield.

TABLE 2

|  | TCS yield | Boron | Phosphorus |
| --- | --- | --- | --- |
| Example 3 | 100% | 17 ppbw | 16.2 ppba |
| Example 5 | 100% | <5 ppbw | 3.1 ppba |

The invention claimed is:

1. A process for purifying chlorosilanes by distillation, which comprises providing a boron-containing mixture of chlorosilanes containing trichlorosilane (TCS), dichlorosilane (DCS) and silicon tetrachloride (STC) and purifying the mixture of chlorosilanes by distillation in a plurality of distillation columns, wherein the mixture of chlorosilanes is fed to a separation column in which column parameters are selected so that less than 10 ppm of STC are present in a first fraction from the separation column and less than 10 ppm of TCS are present in a second fraction from the separation column, wherein the first fraction from the separation column is fed to a third column and separated by distillation into a bottom stream containing TCS and a boron-enriched overhead stream containing TCS together with low boilers such as DCS, wherein the second fraction from the separation column is fed to a second column and separated by distillation into an overhead stream containing STC and a boron-enriched bottom stream containing high boilers, in order to branch off low-boiling boron compounds from the distillation columns via overhead streams containing boron-enriched DCS and high-boiling boron compounds via a boron-enriched bottom stream containing high boilers.

2. The process as claimed in claim 1, wherein the mixture of chlorosilanes which is provided is produced by reaction of metallurgical silicon with HCl in a fluidized-bed reactor at 350-400° C.

3. The process as claimed in claim 1, wherein the overhead stream from the third column is fed into a fourth column into which inert gas is fed, with an overhead stream containing boron-enriched DCS from the fourth column being discharged, a bottom stream from the fourth column being recirculated to the separation column and a secondary stream containing offgas from the fourth column being disposed of.

4. The process as claimed in claim 2, wherein the overhead stream from the third column is fed into a fourth column into which inert gas is fed, with an overhead stream containing boron-enriched DCS from the fourth column being discharged, a bottom stream from the fourth column being recirculated to the separation column and a secondary stream containing offgas from the fourth column being disposed of.

5. The process as claimed in claim 3, wherein the fourth column is operated under superatmospheric pressure.

6. The process as claimed in claim 4, wherein the fourth column is operated under superatmospheric pressure.

7. The process as claimed in claim 3, wherein the overhead stream from the third column is liquefied before being fed into the fourth column.

8. The process as claimed in claim 4, wherein the overhead stream from the third column is liquefied before being fed into the fourth column.

9. The process as claimed in claim 5, wherein the overhead stream from the third column is liquefied before being fed into the fourth column.

10. The process as claimed in claim 6, wherein the overhead stream from the third column is liquefied before being fed into the fourth column.

11. The process as claimed in claim 7, wherein the overhead stream is cooled via a water cooler to a temperature of 10-30° C., a condensate formed is recirculated to the third column, uncondensed material is fed to a brine cooler which cools a product stream to −7° C., where a material which is not condensed in the brine cooler is fed to a low-temperature cooling stage and condensed there to form a condensate and the condensate and a condensate from the brine cooler are fed to the fourth column.

12. The process as claimed in claim 8, wherein the overhead stream is cooled via a water cooler to a temperature of 10-30° C., a condensate formed is recirculated to the third column, uncondensed material is fed to a brine cooler which cools a product stream to −7° C., where a material which is not condensed in the brine cooler is fed to a low-temperature cooling stage and condensed there to form a condensate and the condensate and a condensate from the brine cooler are fed to the fourth column.

13. The process as claimed in claim 9, wherein the overhead stream is cooled via a water cooler to a temperature of 10-30° C., a condensate formed is recirculated to the third column, uncondensed material is fed to a brine cooler which cools a product stream to −7° C., where a material which is not condensed in the brine cooler is fed to a low-temperature cooling stage and condensed there to form a condensate and the condensate and a condensate from the brine cooler are fed to the fourth column.

14. The process as claimed in claim 10, wherein the overhead stream is cooled via a water cooler to a temperature of 10-30° C., a condensate formed is recirculated to the third column, uncondensed material is fed to a brine cooler which cools a product stream to −7° C., where a material which is not condensed in the brine cooler is fed to a low-temperature cooling stage and condensed there to form a condensate and the condensate and a condensate from the brine cooler are fed to the fourth column.

* * * * *